May 10, 1949.  M. RONNING ET AL  2,469,578
BALER WIRE CUTTING AND HOLDING MEANS
Filed Nov. 1, 1946  3 Sheets-Sheet 3
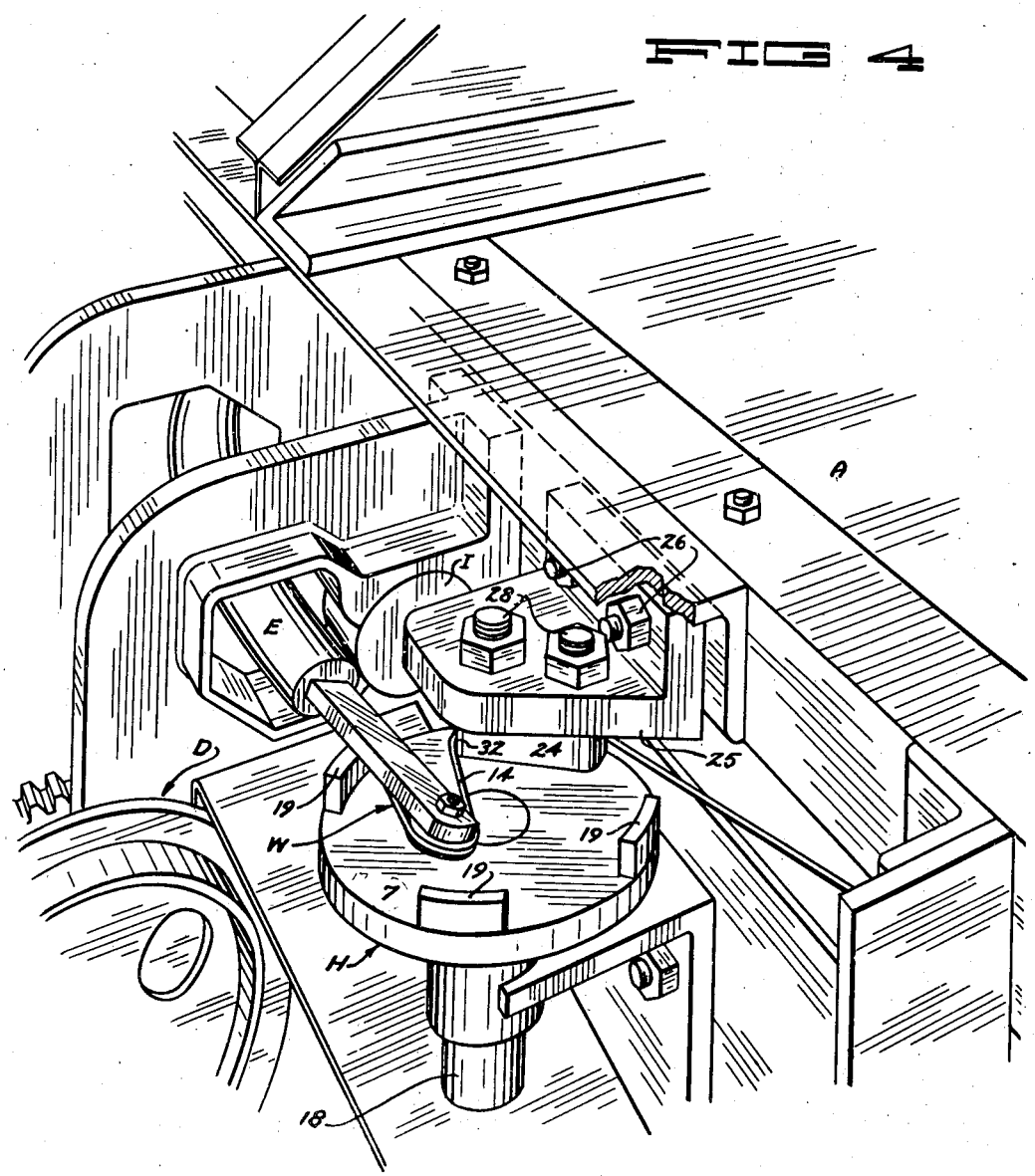
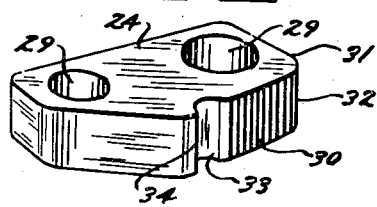
Inventor
MARTIN RONNING
KENNETH M. KEITH
By Carlsen + Hagle
Attorney Patented May 10, 1949

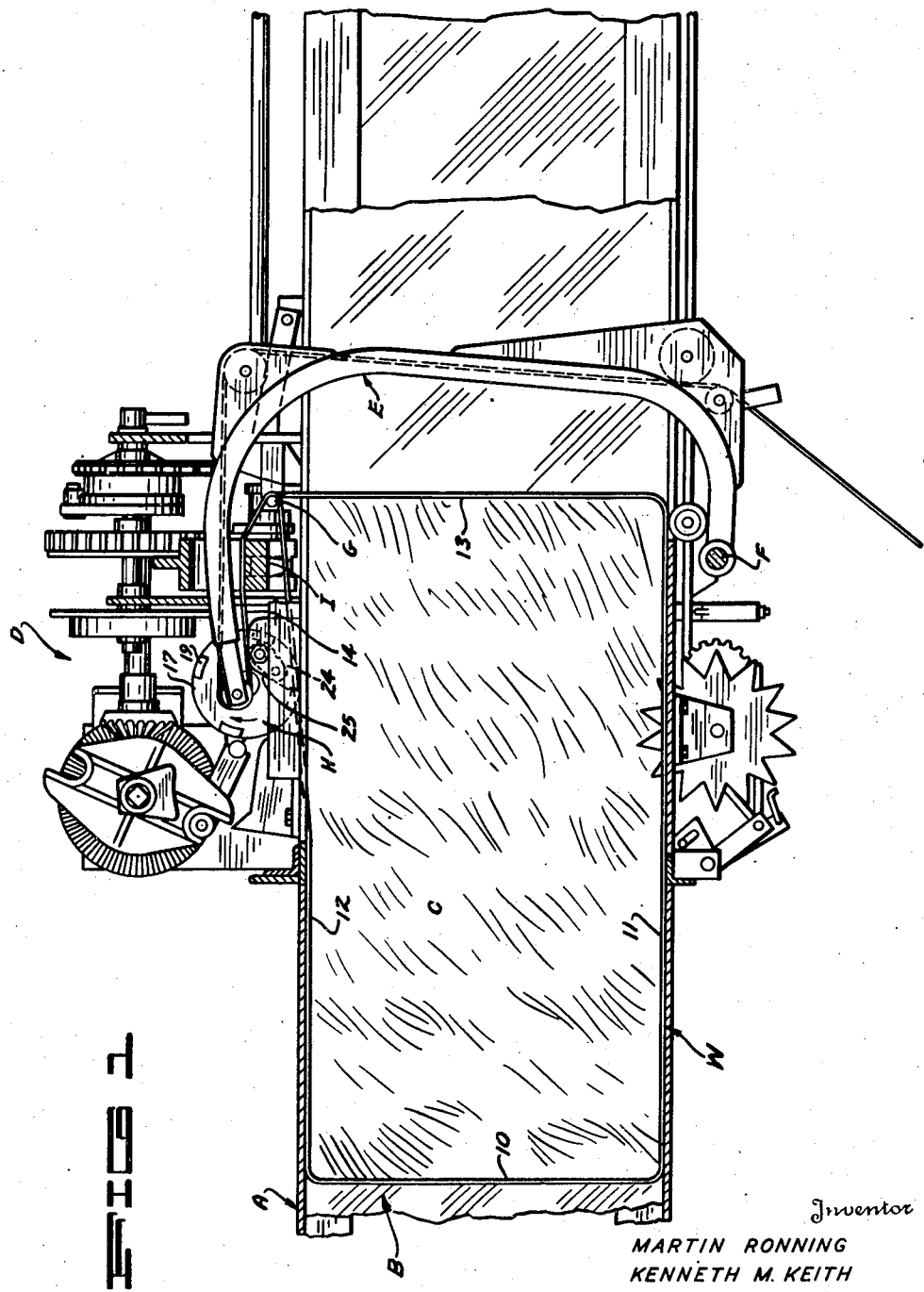

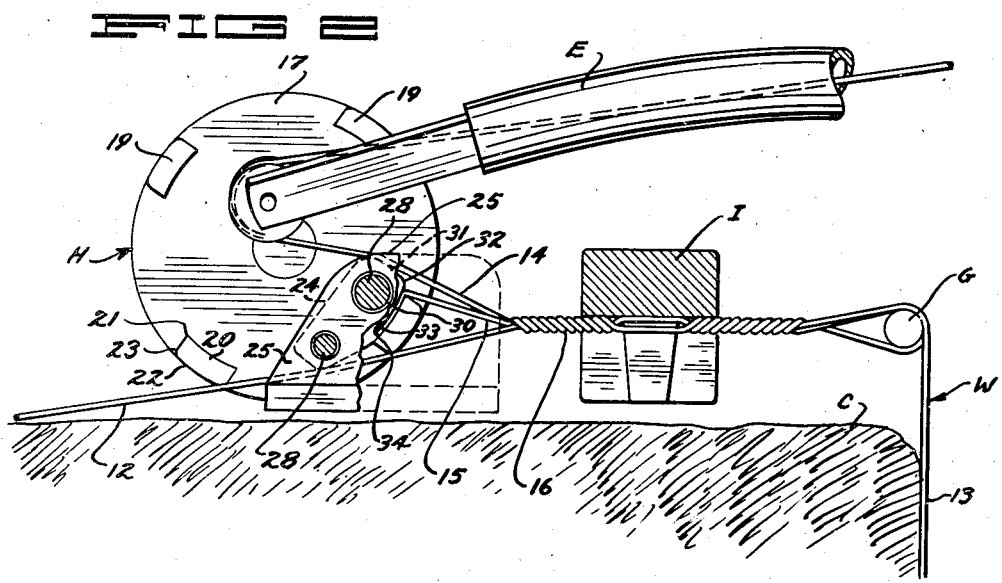
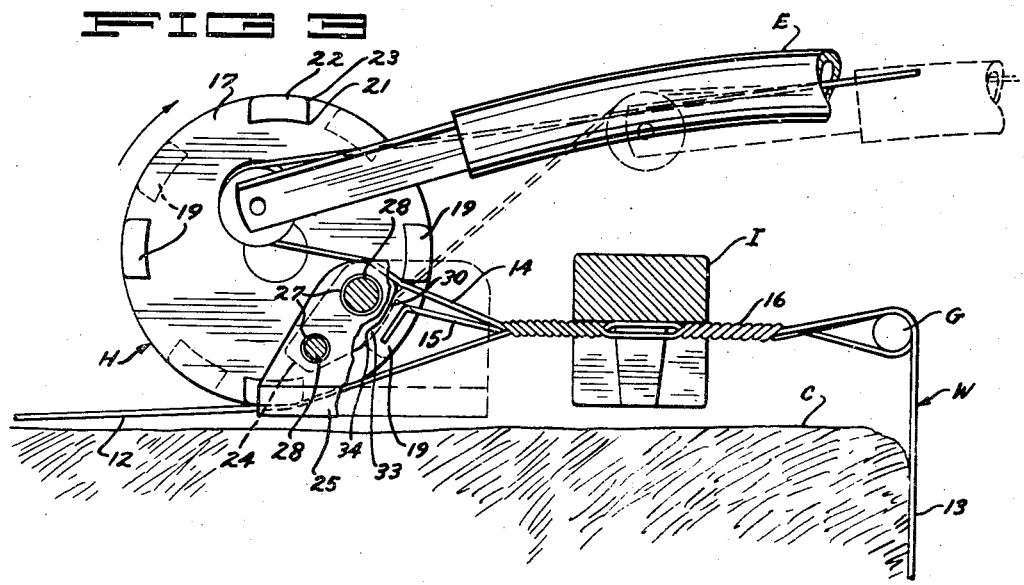
Inventor
MARTIN RONNING
KENNETH M. KEITH

2,469,578

UNITED STATES PATENT OFFICE 2,469,578

BALER WIRE CUTTING AND HOLDING MEANS

Martin Ronning, St. Louis Park, and Kenneth M. Keith, Minneapolis, Minn., assignors, by mesne assignments, to Minneapolis-Moline Company, Hopkins, Minn., a corporation of Minnesota Application November 1, 1946, Serial No. 707,210

9 Claims. (Cl. 100—20)

This invention relates to improvements in hay balers and more particularly to the wire holding and cutting mechanisms thereof.

The invention further relates to certain improvements in the type of baler shown in our prior and co-pending application Serial No. 530,796 for Baling machine, filed April 13, 1944. In that machine, which is of the automatic tying variety, the bales are tied by encompassing wires and the wires are first stretched across the baling chamber and the bale accumulated against the wires so that they enclose one end and opposite sides of the bale. When the bale is completed needles carry the wires across the remaining end of the bale and the wires are twisted together, and cut off so that the bale is ready for delivery. The needles then return to normal positions stringing the wires across the baling chamber again, ready for the next operation.

The wire tying and cutting mechanism therefore must include means for holding the wires as the bale is being accumulated and tied and then for cutting the wire while simultaneously obtaining a new grip on the wires for tying the next bale. It is in connection with this cutting and holding mechanism that our present invention is concerned and the primary object is to provide a mechanism for this purpose which will operate without cutting off short ends of the wire as does the mechanism of our prior application, and others with which we are familiar. These short ends, while they do not represent any appreciable waste do have a tendency to drop into and jam the tying mechanism and are, therefore, undesirable from all standpoints.

Another object is to provide a mechanism of this nature which will operate with the positiveness and precision necessary for automatic tying of the bales and which is simple and practical in construction.

These and other more detailed and specific objects will be disclosed in the course of the following specification, reference being had to the accompanying drawings, in which—

Fig. 1 is a plan view, partially in section, of the bale chamber, tying mechanism and adjacent parts of the baler, embodying our present invention.

Figs. 2 and 3 are similar, enlarged, fragmentary plan and sectional views illustrating two steps in the operation of the wire cutting and holding means.

Fig. 4 is a fragmentary perspective view of the wire cutter and holder and associated parts.

Fig. 5 is a perspective view of the stationary element of the wire cutter and holder, alone.

Referring now more particularly and by reference characters to the drawing, A designates generally the frame of the baling machine which forms a baling chamber B wherein the bale C is accumulated. As pointed out in our previous application hereinbefore identified, and as common with all similar machines, the frame A is supported for travel movement over the field and is adapted to collect the hay from windrows and to compress the hay into the bales C aforesaid. The baler further includes a tying mechanism, designated generally at D, and which will be described herein only in such detail as necessary to an understanding of our present invention.

The bale C when it is completed is tied with upper and lower encompassing wires and we herein show only the uppermost wire, indicated generally at W. It will be understood that the lower wire and its feeding and tying means are substantially identical to those now to be described. The wire W is taken from a continuous length thereof supplied by a wire spool (not shown herein) and from which the wire is pulled off and threaded through a needle E pivotally supported at F alongside the baling chamber. At the start of each baling operation the wire is pulled out through the free end of the needle E and stretched across the baling chamber B and thence rearwardly over a wire holding pin G to a wire holding and cutting mechanism, designated generally at H. The mechanism H, as will be later described, grips this end of the wire W and as the baling operation then proceeds the wire is pulled through the needle and forced rearwardly in the baling chamber B by the accumulated bale until the U-shaped portions 10, 11 and 12 of the wire respectively extend around the rear end and opposite sides of the bale C, as seen in Fig. 1. When the bale is completed then the needle E is swung inwardly to the position shown in Fig. 1 carrying a portion 13 of the wire around the remaining forward end of the bale. The shape of the needle E is such that when swung to this position it will also carry a portion 14 of the wire back around the pin G in lapping relation to the end portion 15 of the side wire 12 which was initially placed around this pin and gripped by the mechanism H. When the wire has thus been arranged entirely around the bale a slotted tying spinner I forming part of the tying mechanism D is rotated and twists the portions 12—14—15 of the wire together forming a tie 16 as seen in Figs. 2-3. At the completion of the formation of this tie 16 the mechanism H operates to release the previously held end 15 of the wire and to cut off the portion 14 thereof adjacent the tie, thus releasing the wires at this point. The wire holding pin G is operated to release the wires at the corners of the bale as the tie is completed, and the mechanism H must also operate to obtain a new grip upon the wire so that as the needle swings back out of the machine a length of the wire will again be disposed across the baling chamber ready for the next bale.

Our present invention relates particularly to improvements in the wire holding and cutting mechanism H and aims to overcome one defect in the corresponding mechanism of our earlier application which, while it operated satisfactorily, was so arranged that short lengths of wire were cut off during each operation. The disposal of these short ends or lengths of wire is a problem in that they have a tendency to drop into the tying mechanism D and cause a jam to occur somewhere in the necessarily quite complex parts thereof.

Referring more especially to Figs. 2 through 5, the mechanism H is seen to comprise a movable member in the form of a rotary disk 17 carried by an upright shaft 18 and having upstanding lugs 19 around its upper edges. As here shown the lugs 19 are four in number and the actuating mechanism for the disk 17 is so arranged as to rotate the disk through a quarter turn at the completion of each tying operation. The lugs 19 have arcuate inner surfaces 20 having sharp corners 21 to act as cutters as will be later described, and having arcuate outer surfaces 22 the corners of which are rounded, as indicated at 23. Cooperating with the disk and lugs just described is a single stationary member designated generally at 24 which is supported above the disk 17, inside the path traveled by the lugs 19, by means of a bracket 25 bolted at 26 to the adjacent side of the frame A. The bracket 25 extends outwardly some distance above the disk and has a pair of openings 27 through which bolts 28 are passed to secure the member 24 to the bracket. The stationary member 24 also has openings 29 to receive the bolts 28 and it will be noted that the openings 27 are substantially larger than the bolts so as to permit some adjustment of the member 24 to bring it into proper relation with the path of the lugs 19.

The member 24 has an arcuate gripping or holding surface 30 located on the outer side facing the lugs 19 and the end 31 of the member meets this surface on a radius forming a rounded corner 32 as clearly shown. The surface 30 extends from the corner 32 in the direction of travel of the disk 17, indicated by the arrow in Fig. 3, for some distance and terminates in a notch 33 one edge of which is sharpened as indicated at 34 to operate in shearing relation with the aforesaid cutting corners 21 of the lugs. The member 24 is so adjusted that the inside surfaces 20 of the lugs will pass in closely spaced relation to the gripping surface 30 and will then traverse the edge 34 in the aforesaid shearing relation.

In describing the operation it will be assumed first of all that the tie 16 has just been completed, as is the condition illustrated in Fig. 2. It will be noted that the wire end 15 is at this time gripped between the inner surface 20 of one of the lugs 19 and the adjacent gripping surface 30 of the stationary member 24 and that the wire 14 passes from the tie across the end of the member 24 and into the needle E. At the completion of the tying operation the disk 17 is rotated a quarter turn and at the outset of this movement the lug 19 previously gripping the wire end 15 will release this end as seen in Fig. 3 and as the movement continues the next succeeding lug 19 will come into engagement or pick up the wire 14 and will force it smoothly around the corner 32 of the member 24 into frictional or clamping engagement with the surface 30. Just as this quarter turn is then completed the corner 21 of this lug 19 will move into shearing relation with the cutting edge 34 of the member 24 and will sever the wire 14 at this point leaving the portion gripped against the surface 30 attached to the end of the needle and, of course, disconnecting the wire at this point from the tie 16. When the wire holding pin G now releases the wire it will spring tight against the bale C and this tied bale may move out as the next bale is accumulated. The end of the wire 14 now gripped between the lug 19 and member 24 will be held thereby as the needle E swings back out of the machine and stretches a new length of wire across the baling chamber for this next bale.

Attention is called to the fact that the end of the wire 15 as it is released by the mechanism H remains connected to the tie 16 and is not severed therefrom, as has been the case in our previous machine and other mechanisms for the same purpose with which we are aware. In other words, due to the fact that both the wire gripping and wire cutting surfaces of the stationary member 24 are inside the path of the lugs 19 the gripped end of the wire is left free to move out of the way each time it is released and to remain attached to the tie 16 as is desired and loose wire to prevent formation of the troublesome short and loose wire ends previously described.

As seen in Fig. 5 of the drawing the surface 30 of the stationary member 24 may be provided with serrations or otherwise roughened in order to best obtain a grip upon the wire in a well-known manner.

It is understood that suitable modifications may be made in the structure as disclosed, provided such modifications come within the spirit and scope of the appended claims. Having now therefore fully illustrated and described our invention, what we claim to be new and desire to protect by Letters Patent is:

1. For a baling machine tying mechanism including mechanisms operative for tying a wire about the bale, wire cutting and holding means of the character described comprising a movable member having a cutting and holding lug, and a stationary member having a gripping surface and a cutting edge adapted to co-act with the lug to first grip one end of the wire and then cut the wire loose from the gripped end.

2. For a hay baler having mechanism for placing a wire around the bale and tying means for tying the wire, means for cutting off the wire after it is tied and for holding the end of the wire thus freed from the bale, comprising a movable member having a lug, and a stationary member positioned adjacent the path of the lug and having a surface cooperating with the lug and adapted to grip the wire and a cutting edge against which the lug may cut the gripped portion of the wire loose from the wire tied around the bale.

3. For a hay baler having mechanisms operative to dispose a wire around the bale and for tying the wire, means for cutting the wire after it is tied and for gripping the wire cut free from the bale, comprising a rotary member having at least one lug, a stationary member having a gripping surface and a cutting edge, and means for rotating the member to cause the lug to first force and grip the wire against said gripping surface and then to sever the wire at said cutting edge.

4. In a hay baler having a movable wire cutting member with at least one projecting lug, a single stationary member supported adjacent the path of said lug and having a gripping surface on one side cooperating with the lug to first grip a wire and a cutting edge on the same side cooperating in shearing relation with the lug to then sever the wire adjacent the gripped portion.

5. For a hay baling machine having mechanism operative to dispose a portion of a continuous length of wire around the bale and mechanism for tying the wire, means for cutting the tie away from the length of wire and for holding the cut end of the wire while forming the next bale, comprising in combination, a rotary disk having a lug adapted to engage the wire as the tie is completed, and a stationary member supported for cooperation with said lug to first grip the wire adjacent the tie and then cut the wire between the gripped portion and the tie.

6. For a hay baling machine having mechanism operative to dispose a portion of a continuous length of wire around the bale and mechanism for tying the wire, means for cutting the tie away from the length of wire and for holding the cut end of the wire while forming the next bale, comprising in combination, a rotary disk having a lug adapted to engage the wire as the tie is completed, and a stationary member supported inside the path of the lug and having portions cooperating with the lug to first frictionally grip the wire and then cut the wire fee from the tie.

7. For a hay baler of the character described having mechanism operative to position an end portion of a length of wire around the bale and mechanism for forming a tie where the wire meets around the bale, means for severing the tie from the remaining length of the wire and for gripping the end thereof while another bale is formed, comprising a rotary disk positioned adjacent the tying mechanism, said disk having a series of cutting and holding lugs, a member stationarily supported adjacent the path of the lugs, and said stationary member having portions adapted first to cooperate with one of the lugs to grip a portion of the wire and then to cut the wire between the gripped portion and the tie, and said gripping and cutting portions of the stationary member being positioned inside the path of the lugs whereby the gripped portion of the wire will be released as each tie is completed and will move clear of the next lug as the disk rotates.

8. In a hay baler having a movable wire cutting member with at least one lug, a stationary member supported adjacent the path of the lug and having a roughened gripping surface cooperating with the lug to first grip a wire engaged and forced by said lug against said surface, and the said member having also a projecting cutting edge on the same side and adjacent said gripping surface cooperating in shearing relation as the lug travels past to cut the wire adjacent the gripped portion thereof.

9. In a hay baler having a movable wire cutting member with at least one lug, a stationary member supported adjacent the path of the lug and having a roughened gripping surface cooperating with the lug to first grip a wire engaged and forced by said lug against said surface, and the said member having also a projecting cutting edge on the same side and adjacent said gripping surface cooperating in shearing relation as the lug travels past to cut the wire adjacent the gripped portion thereof, the said lug being arranged to travel in an arcuate path and the side of the stationary member having the gripping surface and cutting edge being arcuately shaped to correspond with that path.

MARTIN RONNING.
KENNETH M. KEITH.

REFERENCES CITED

The following references are of record in the file of this patent:

UNITED STATES PATENTS

| Number | Name | Date |
| --- | --- | --- |
| 1,534,359 | Collins | Apr. 21, 1925 |